United States Patent [19]

Pascouet et al.

[11] 4,185,714
[45] Jan. 29, 1980

[54] IMPLOSIVE ACOUSTIC GENERATOR

[76] Inventors: Adrien P. Pascouet, 224 Avenue Republique, Toulon, France, 83100; Chadwick O. Davies, 32 rue Saint Fargeau, Paris, France, 75020

[21] Appl. No.: 857,146

[22] Filed: Dec. 5, 1977

Related U.S. Application Data

[63] Continuation-in-part of Ser. No. 677,583, Apr. 16, 1976, abandoned.

[30] Foreign Application Priority Data

Apr. 18, 1975 [FR] France .................... 75 12221
Apr. 18, 1975 [FR] France .................... 75 12222

[51] Int. Cl.² ............................................. G01V 1/14
[52] U.S. Cl. ............................. 181/120; 181/115; 367/146
[58] Field of Search .............. 181/115, 118, 120; 340/8 FT, 9, 17

[56] References Cited

U.S. PATENT DOCUMENTS

| | | | |
|---|---|---|---|
| 3,739,869 | 6/1973 | Mayne | 181/120 |
| 3,951,231 | 4/1976 | Leonard | 181/118 |

OTHER PUBLICATIONS

Renard et al., "Simplar Water Gun, A New Implosion Type Seismic Source", 5/8/74, pp. 773-777, o.t.c. 6th, vol. I, paper 2017.
Avedih et al., "New High Energy Implosion Seismic Source", 7/73, pp. 42-43, Ocean Industry.

Primary Examiner—Nelson Moskowitz
Attorney, Agent, or Firm—Michael P. Breston

[57] ABSTRACT

The invention has application to an implosive sound generator which produces in a body of water a cavity that implodes resulting in a large acoustic impulse. The invention provides means for eliminating or substantially reducing the bubble effect by providing means for absorbing the rebound of the implosion of the cavity and preferably also for cancelling the recoil of the generator. A preferred embodiment of the generator comprises a slug chamber having a primary port. The slug chamber entraps a liquid slug therein when the generator is submerged in a liquid body. Force means propel the liquid slug with sufficient kinetic energy to create in the liquid body a main cavity which is imploded by the hydrostatic pressure head. To reduce or eliminate the rebound of the implosion, there is provided a suction chamber having at least one secondary port communicating with the liquid body near the site of the main cavity. A cavity is formed inside the suction chamber prior to the formation of the main cavity so that the main cavity and the suction cavity form one continuous cavity. The rebound of the implosion of the main cavity is absorbed by the cavity in the suction chamber thereby suppressing the bubble effect which would otherwise result from the rebound of the implosion of the main cavity. The generator preferably has a deflector for deflecting the high velocity liquid slug after it is propelled from the slug chamber, thereby eliminating the recoil of the generator.

10 Claims, 26 Drawing Figures

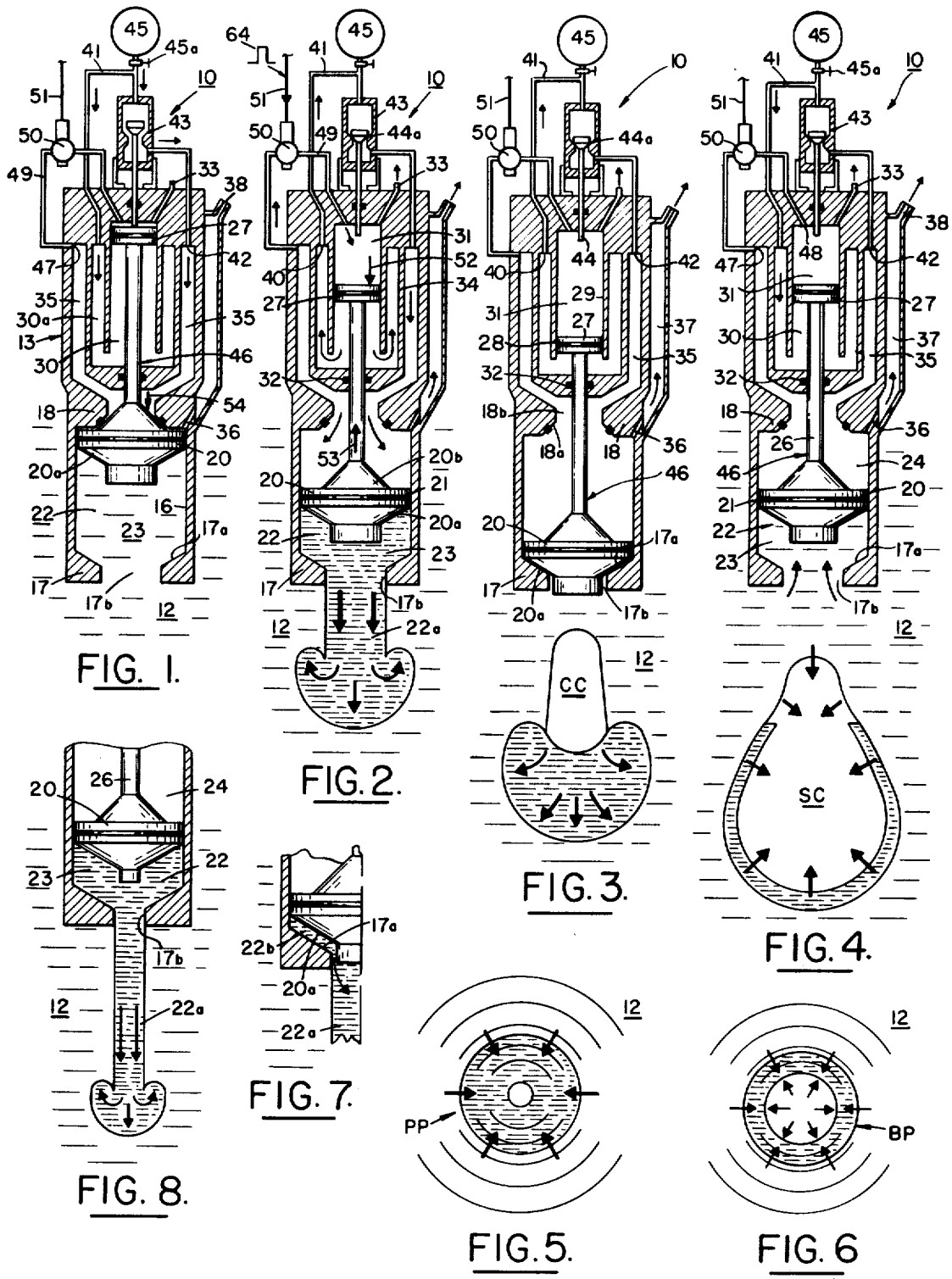

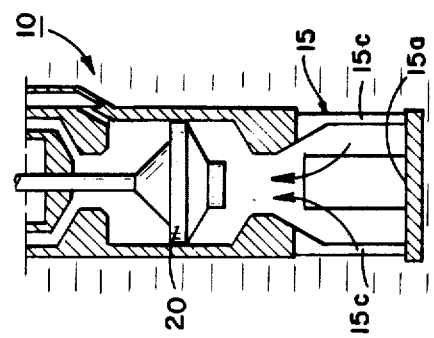
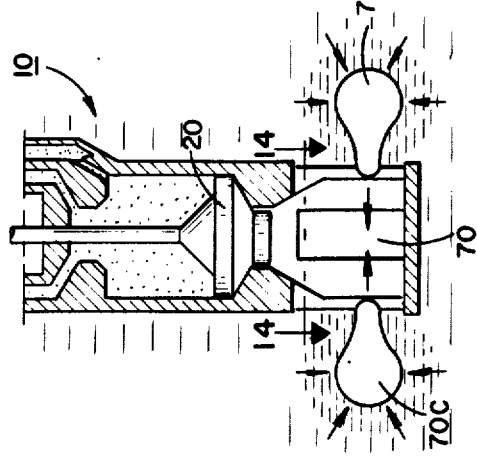
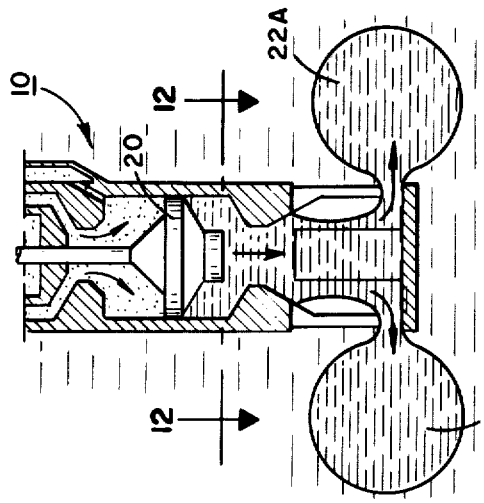
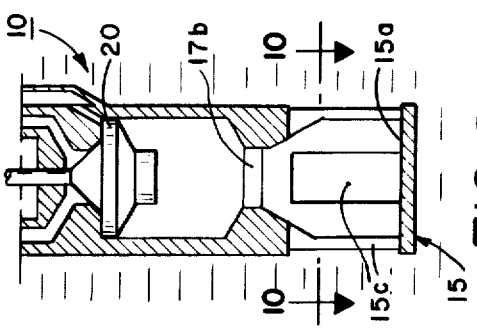
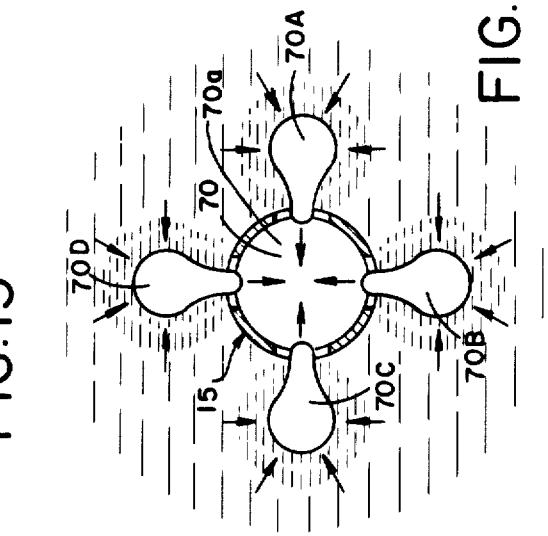
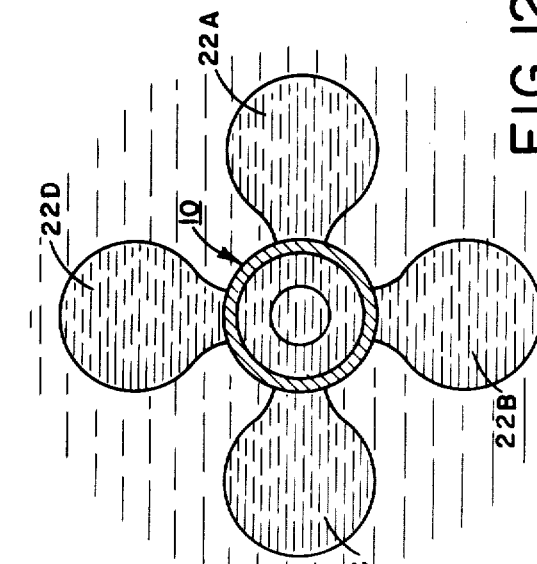
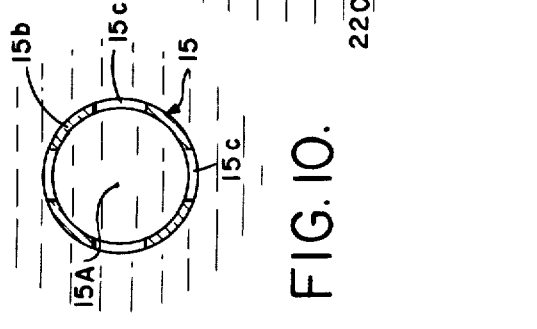

IMPLOSIVE ACOUSTIC GENERATOR

REFERENCE TO RELATED APPLICATION

This application is a continuation-in-part of copending application Ser. No. 677,583 filed on Apr. 16, 1976 and now abandoned.

BACKGROUND OF THE INVENTION

Acoustic implosion generators for producing in water acoustic impulses are known. U.S. Pat. No. 3,369,627 shows a generator wherein a cavity is created between two rapidly separating plates. The violent collapse of this cavity by the surrounding water generates an acoustic impulse which propogates throughout the body of water.

U.S. Pat. No. 3,642,090 shows a generator having a piston moving away from a liquid body faster than the liquid body can follow the piston. A cavity is formed between the piston and the surrounding liquid body. The surrounding liquid rushes in to fill this cavity and in so doing a high-power acoustic impulse becomes generated in the liquid body.

Similar generators are described in U.S. Pat. Nos. 3,642,089 and 3,711,824.

A new implosion generator, known as a "WATER GUN®", is described in French Pat. Nos. 72,14513 and 73,15317 and in Ocean Industry, pages 42–43, July, 1973.

The known implosion generators have had very limited commercial success because of the inherent drawbacks in their mechanical constructions, of their poor "pressure signatures", and for other reasons which will become apparent from the following description.

This invention is an improvement on such implosive generators and especially on the WATER GUN primarily in that it allows an automatic return stroke of the gun's piston, it eliminates the recoil of the gun, and most importantly it substantially reduces or completely suppresses the bubble effect produced by known implosive generators.

SUMMARY OF THE INVENTION

The generator of this invention creates a main cavity in a liquid body and comprises a suction chamber having a port which communicates with the liquid body near the site of the main cavity. A cavity is created and maintained in the suction chamber prior to the creation of the main cavity, so that the cavity in the suction chamber and the main cavity form one continuous cavity. The implosion of the main cavity produces a rebound which is absorbed by the cavity in the suction chamber.

A preferred embodiment of the generator comprises a main housing defining a slug chamber which, when the housing is submerged in a liquid body, entraps a liquid slug therein. The slug chamber has a main port communicating with the liquid body. Force means propel at high velocity the liquid slug. The slug's kinetic energy is sufficient to create, in the liquid body, a main cavity which is imploded by the hydrostatic pressure head. To eliminate or substantially suppress the subsequent expansions and contractions of the highly-compressed water in the main cavity, the generator also includes a secondary housing defining a suction chamber having at least one port communicating with the liquid body. A secondary cavity is formed inside the suction chamber, whereby the primary and secondary cavities form one continuous cavity. The secondary cavity absorbs the rebound from the implosion of the main cavity thereby suppressing the bubble pulses which would otherwise result from the implosion of the main cavity. To eliminate the reaction forces on the generator, that is the recoil of the generator, a jet deflector is secured to the main housing to deflect the trajectory of the high-velocity liquid slug.

BRIEF DESCRIPTION OF THE DRAWINGS

FIGS. 1–4 are sectional views in elevation of one embodiment of the impulse generator of the invention, illustrating various positions of the shuttle therein and of the water jet produced thereby;

FIG. 5 illustrates the collapse of a spherical cavity by the surrounding high-pressure water layer which gives rise to a desired very-high pressure impulse;

FIG. 6 illustrates the rebound effect of the implosion which tends to produce an undesired bubble impulse;

FIG. 7 illustrates the cushioning effect produced by the beveled surfaces of the piston;

FIG. 8 illustrates the relationship between the cross-sectional area of the main port and the shape of the water jet produced therethrough;

FIGS. 9, 11, 13 and 15 are sectional views in elevation of an improved impulse generator having at jet splitter-and-deflector;

FIG. 10 is a sectional view on line 10—10 in FIG. 9;

FIG. 12 is a sectional view on line 12—12 in FIG. 11;

FIG. 14 illustrates the formation of cavities in the water, and in the suction chamber of the jet splitter, and the implosions of such cavities;

FIG. 16b is a filtered version of the waveform shown in FIG. 16a;

DETAILED DESCRIPTION OF THE PREFERRED EMBODIMENTS

Figure 16A:
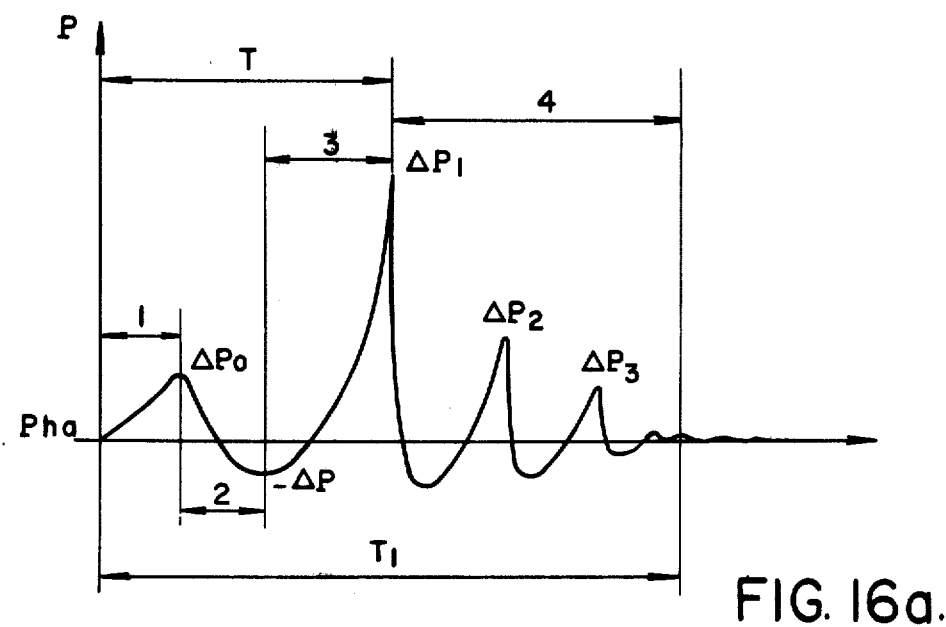
FIG. 16a shows a generalized waveform of the pressure signature produced by an imploder-type impulse generator.

An improved embodiment of an implosive acoustic generator of the invention, known as a "WATER GUN" generally designated as 10, is shown in (FIGS. 1–4). It includes a main cylindrical housing 13. Housing 13 has a cylindrical bore 16 between stop walls 17–18, having piston seats 17a–18a, respectively. Seat 17a defines a main port 17b, and seat 18a defines a port 18b.

When submerged, main port 17b communicates with the liquid body, typically water 12.

A main piston 20 is slidably mounted in bore 16 on seal ring 21. Ports 17a–18a have beveled surfaces, and piston 20 is shaped, at the top and bottom, to have matching tapered surfaces 20a–20b, respectively.

The principle of operation of generator 10 is based on projecting a water slug 22, entrapped inside a slug chamber 23 defined by bore 16 between ring 21 and stop wall 17. Bore 16 also defines a chamber 24 between ring 21 and wall 18.

The water slug 22 is projected into a water jet 22a by the application of a force field having a resultant force in an axial direction. The means for producing the force field include an actuating member, such as a push rod 26 having one end connected to piston 20 and another end connected to an auxiliary piston 27 slidably mounted on ring 28 in a cylindrical bore 29. Bore 29 defines a return chamber 30 underneath piston 27 and a trigger chamber 31 above piston 27. Chamber 30 is made fluid tight by a ring seal 32 sealingly and slidably receiving push rod 26. Chamber 31 continuously vents into the water through a vent hole 33.

For any particular size of generator 10, there will correspond an optimum length for chamber 30 which will yield an acoustic impulse of maximum energy. If the optimum length for chamber 30 makes generator 10 undesirably long, chamber 30 can be "folded" so that a portion thereof is inside, and another portion 30a thereof lies between bore 29 and a cylindrical wall 34. The volume between wall 34 and the housing forms a reservoir chamber 35. Chamber 24, even when reduced to its smallest dimensions, continuously vents through a very small vent hole 36. While vent hole 36 can vent into the water 12, it is preferable that it vent into an expansion chamber 37 of considerable volume, and that chamber 37 vent to the water through a small top vent hole 38.

Generator 10 is powered by an air compressor 45 producing, at the output of a control valve 45a, a regulated, controllable stream of air pressure. Valve 45a is coupled to inlet 40 of chamber 30a by channel 41. Chamber 35 has an inlet 42 coupled to channel 41 through a normally-closed valve 43, which is operated by a plunger 44 sealingly and slidably mounted in the upper wall of chamber 31. When piston 27 reaches its uppermost position (FIG. 1), plunger 44 is lifted from its seat 44a, thereby mechanically opening valve 43 and admitting high-pressure air into inlet 42 of chamber 35. The amount of back pressure on piston 27 is controlled by vent hole 33, and the amount of back pressure on piston 20 is controlled by vent holes 36 and 38. Thus the air pressure in chambers 24 and 31 serves as a fluid shock absorber.

The assembly consisting of pistons 20, 27 and push rod 26 forms a shuttle 46. To propel shuttle 46 downwardly (FIG. 2), a trigger pressure will be applied to the top of piston 27. This trigger pressure is obtained from outlet 47 of chamber 35. Outlet 47 is coupled to inlet 48 in chamber 31 through channel 49 having a valve 50, which is preferably solenoid-operated. Valve 50 is normally closed and opens only in response to an applied electrical signal 64 arriving on line 51.

An improved embodiment of generator 10 comprises a jet splitter-and-deflector and bubble suppressor, generally designated as 15 (FIGS. 9–10).

The deflection of water jet 22a is accomplished by a deflector such as plate 15a, which may be flat or conically shaped, that is secured to main housing 13. Plate 15a is placed at a suitable distance from main port 17b.

The jet-splitting and bubble-suppression function is accomplished by a secondary housing 15b defining a suction chamber 70 having at least one outlet port 15c communicating with the water body 12. For typical seismic exploration, the optimum number of outlet ports 15c is four, and the same are spaced from each other by an angular distance of approximately 90°. If only a pair of outlet ports 15c is employed, they will be diametrically oppositely spaced. The volume of suction chamber 70 and the area of each port 15c are selected to allow housing 15b to accomplish its bubble-suppression function in a suitable time interval; said volume and area can be determined empirically and/or theoretically. Empirically they can be determined with the aid of an underwater camera and/or with a hydrophone positioned in the vicinity of housing 15b. Theoretically they can also be determined from known studies based on the Rayleigh-Willis formula $$T = \frac{.000209(KQ)^{1/3}}{(d + 33)^{5/6}}$$

where:
K is a constant;
d is the depth of the bubble center beneath the water surface;
Q is the energy of the secondary cavity;
T is the period of secondary cavity.

While the acoustic impulse generator 10 of this invention will find applications in various industries, as will become apparent to those skilled in the art, it will be described for conducting seismic exploration.

For such seismic use (FIG. 20), one or more generators 10 are normally towed submerged by a seismic vessel 60 and are cyclically operated to produce a train of high-power, short duration, sharp acoustic impulses in the water body 12. Generator 10 is supported by an adjustable hanger 61. On vessel 60 are positioned the air compressor 45 with its associated devices and a signal recorder-and-processor unit 62. Compressor 45 is connected to valve 45a through line 41. Unit 62 receives the detected reflected seismic signals from a towed streamer cable 63, and produces the trigger pulse 64 transmitted via line 51 for opening valve 50, thereby "firing" generator 10.

DETAILED DESCRIPTION OF OPERATION

To make generator 10 ready for operation (FIG. 1), control valve 45a is opened to pressurize return chamber 30 through inlet 40. The admitted pressure causes piston 27 to automatically return to its cocked position whereby plunger 44 becomes lifted from its seat 44a to open valve 43. Air pressure, say at 150 bars, can now fill reservoir chamber 35. Chambers 24, 31 and 37 are substantially at the ambient hydrostatic pressure. A water slug 22 now fills slug chamber 23. Generator 10 is now pressure-loaded, and shuttle 46 is in its cocked position.

THE FORWARD STROKE OF SHUTTLE 46

To allow shuttle 46 to execute its forward stroke (FIG. 2), a trigger pulse 64 is transmitted, causing valve 50 to open, thereby establishing pressure communication between chambers 31 and 35. A downwardly-directed trigger force 52 (FIG. 2) becomes exerted against piston 27. This force is combined with the already existing downwardly-directed force 54 (FIG. 1) to produce a resultant force that is exerted on the portion of piston 21 opposite to port 18b. The resultant force overcomes the sum of all upwardly-directed forces 53 exerted on shuttle 46. As a result, shuttle 46 starts moving donwardly to execute its forward stroke.

When the exposed portion 20b of cylinder 20 becomes disengaged from seat 18a, the high pressure in chamber 35 becomes exerted against the entire piston 20 resulting in the abrupt propulsion of shuttle 46. The high pressure starts venting through vent hole 36 into the detente chamber 37 and from there to the water 12 through vent hole 38.

The beveled surface 17a of main port 17b serves a very important function (FIG. 7). Before tapered surface 20a approaches tapered surface 17a, the water slug 22 has no difficulty in exiting through the main port 17b. When tapered surface 20a approaches tapered surface 17a, an annular ring of water 22b becomes entrapped therebetween which serves as a liquid shock absorber for piston 20. Without the cushioning effect produced by the entrapped annular water ring, generator 10 might sustain considerable stresses which would tend to shorten the useful life of the generator.

The shape of the water jet 22a produced from the water slug 22 also depends (FIGS. 2, 8) on the cross-sectional area of main port 17b: the smaller this cross-sectional area is, the longer and thinner water jet 22a will be.

The fast moving water jet 22a, when it separates from piston 20, first produces in the water a nearly cylindrical cavity CC (FIG. 3) and then a nearly spherical cavity SC (FIG. 4). The hydrostatic pressure head causes the collapse of the cylindrical cavity which results in a two-dimensional implosion, and the collapse of the spherical cavity produces a three-dimensional implosion, at a safe distance from generator 10. This distance depends on the velocity of jet 22a and the cross-sectional area of the main port 17b (FIGS. 1, 8).

Thus, when the force field exerted on the water slug 22 is stopped, as by arresting substantially instantaneously the motion of piston 20 (FIG. 3), the propelled water jet 22a continues its downward motion, away from the stopped piston 20, and in so doing creates a two-dimensional implosion followed by a three-dimensional implosion.

The acoustic energy resulting from implosion CC (FIG. 3) is at best proportional to the volume of the water slug 22, and the acoustic energy resulting from implosion SC (FIGS. 4, 5) is roughly proportional to the kinetic energy of the water jet 22a. Thus the kinetic energy of jet 22a, which is determined, in part, by the cross-sectional area of main port 17b and by the pressure exerted by the shuttle 46 on water slug 22, plays a predominant role in the quantity of acoustic impulse energy obtained from generator 10.

Also, from a structural point of view, the further the three-dimensional spherical cavity implosion takes place from generator 10, the better it is for the generator, since if the entire implosion took place between or too near to the structural members of the generator, there would result a rapid fatigue in the generator's housing, thereby considerably reducing the life span of the stationary and moving parts in generator 10.

THE AUTOMATIC RETURN STROKE OF SHUTTLE 46

When shuttle 46 comes to a stop (FIG. 3), chambers 24, 31 and 37 continue to vent until the back pressure is sufficiently reduced, and shuttle 46 can start on its return stroke. The return velocity of shuttle 46 is affected by the rate of venting of chamber 24. When the volume of chamber 24 diminishes, the pressure therein increases, whereby to decelerate the upward movement of the shuttle. Chamber 31 also continuously vents through vent hole 33 to the water 12 so as not to contribute to the deceleration force produced by the back pressure on the returning shuttle 46. By properly sizing the vent holes, the rate of return for the shuttle can be adjusted to obtain a desired pulse repetition rate.

In practice, shuttle 46 executes its forward stroke in a time interval which is relatively short compared to the time interval for its return stroke, and generator 10 is operated repetitively to produce in water body 12 a train of high-powered acoustic impulses which become reflected from the earth formations 12a lying below the water. The reflected seismic signals are detected by the streamer cable 63 whose output signals are recorded and processed by the recording-and-processing unit 62 on the deck of seismic vessel 60. The processing of the reflected seismic signals allow a geologist to study the nature of the earth formations below the bed of the water body 12.

When the matching surfaces 20b and 18a re-engage (FIG. 1), that is when piston 27 attains its cocked position, and plunger 44 will move up, thereby mechanically and automatically reopening valve 43 through which high pressure will again be admitted into reservoir chamber 35. Simultaneously, chamber 30 is also being repressurized, since the return stroke of piston 27 has caused an increase in the volume of chamber 30. Conversely, during the forward stroke of piston 27, the volume of chamber 30 decreases (FIG. 3), and some of the air pressure from chamber 30 escapes through inlet 40 to the pressure source 45.

OPERATION OF EXPANSION CHAMBER 37

Figure 19A:
FIG. 19a illustrates the pressure signature produced by the generator without an expansion chamber.
Figure 19B:
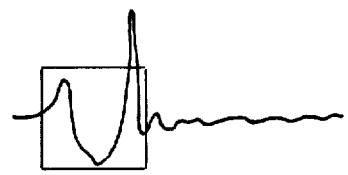
FIG. 19b shows a pressure signature of the implosive generator with an expansion chamber.

The implosion (FIGS. 4, 5) takes place very rapidly even before shuttle 46 starts on its return stroke. Without expansion chamber 37, chamber 24 would vent directly into the water at a point too close to the site of the implosion, and the vented air would act as an acoustic energy absorber for the high-pressure water, thereby attenuating the output acoustic impulse of generator 10. The difference in the acoustic signals, known as "pressure signatures", can be seen by comparing FIGS. 19a and 19b. By providing expansion chamber 37, chamber 24 can first vent into expansion chamber 37 during the time of implosion. Also, the fact that vent hole 38 is directed upwardly, and at a greater distance from the site of implosion, improves the pressure signature, which is cleaner, narrower, and larger with chamber 37 (FIGS. 19b) than without chamber 37 (FIGS. 19a).

OPERATION OF DEFLECTOR 15a

When generator 10 has no deflector 15a (FIGS. 1–4), after each firing of the generator there is produced an upwardly-directed reaction force which causes a recoil on the generator. It is frequently desired or even necessary to eliminate the recoil of the generator. This is accomplished by the deflector 15a which deflects the water jet 22a in a transverse plane so as to produce reaction forces that are perpendicular to the generator's axial direction, thereby suppressing the recoil. Deflector 15a must be fixedly secured to the generator's main housing 13.

OPERATION OF THE SUCTION CHAMBER 70

When the void of a cavity implodes (FIG. 5), it becomes filled with a volume of very high-pressure water which produces a desired primary compression PP and hence a large acoustic pulse. At the pressures involved, the water as well as the water vapor in the cavity act as a spring which, after the implosion, rebounds to produce a secondary compression (FIG. 6), known as a "bubble" pulse BP which constitutes an undesired seismic pulse that also causes reflections from the underlying earth layers 12a. The deflected reflected bubble signals greatly complicate the processing of the seismic signals as is well known to those skilled in the seismic art.

The undesired bubble pulses can be eliminated or greatly suppressed in accordance with a very important aspect of this invention by using the suction chamber 70 in the secondary housing 15b (FIGS. 9-15).

Chamber 70 forces the main water jet 22a to split. In the case of four ports 15c, it splits into four branch jets 22A-22D exiting through the ports 15c. Each branch jet produces a main cavity (FIGS. 13, 14). But, in accordance with a very important characteristic of this invention, the main jet 22a itself produces a secondary or suction cavity 70a inside suction chamber 70, while jets 22A-22D produce primary cavities 70A-70D, respectively, outside of housing 15b. Cavity 70a and cavities 70A-70D form one continuous cavity. If more than four ports 15c are employed, the implosions would tend to interfere with each other. With four ports 15c, the primary cavities 70A-70D do not appreciably interfere with each other, since they are angularly displaced from each other by about 90°.

It was discovered that the secondary cavity 70a produced within suction chamber 70 implodes only after the implosion of the primary cavities 70A-70D, so that the volume of the secondary cavity 70a sucks in the rebounding high-pressure waters which otherwise would produce the bubble effect resulting in undesired bubble pulses. Thus, the provision of the suction chamber 70 in secondary housing 15b has eliminated or substantially suppressed the bubble pulses BP which are highly undesirable for conducting seismic surveys.

In general, in order for the suction chamber 70 to substantially completely cancel the rebound of the implosions of the main cavities 70A-70D without emitting bubble pulses, the cavity 70a in the suction chamber must remain void until after the main cavities have had the opportunity to implode, the suction chamber must be close to the main cavities so that the secondary cavity 70a can form together with the main cavities 70A-70D a unitary cavity, the suction chamber must have sufficient volume to allow a sufficient amount of high pressure water to rush in and fill the suction chamber within a relatively short time interval typically a few milliseconds, and the suction chamber must be sufficiently confining to avoid secondary or bubble pulses to become emitted by the implosion of the secondary cavity 70a within the suction chamber.

Figure 21:
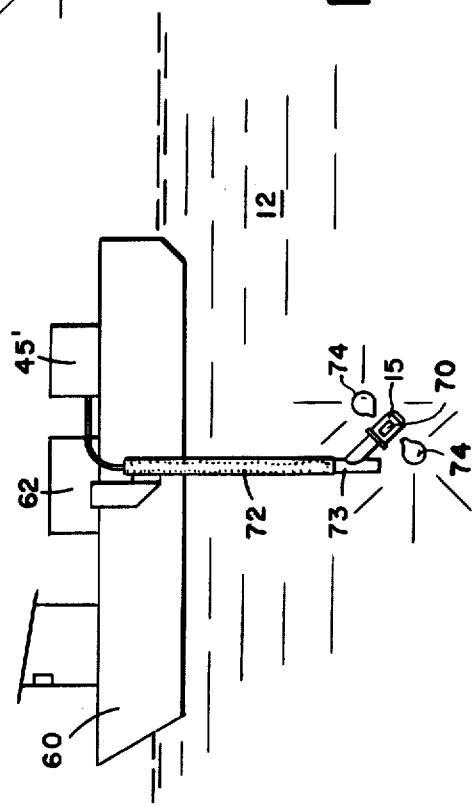
FIG. 21 shows the use of a suction chamber with an implosive generator employing vapor bubbles.

The provision of a secondary housing with a suction chamber having the above described characteristics can be beneficial to any type of implosive acoustic generator and the advantages of the suction chamber 70 can be illustrated, for example, in connection with an implosion produced by a steam generator 45' (FIG. 21) discharging superheated into the water body 12.

The superheated steam is discharged by an insulated pipe 72, immersed about 3 to 5 meters below the water's surface. At the end of the pipe is a steam valve 73 that periodically ejects into the water a bubble of superheated steam having a pressure of approximately 90 bars at a 100° C. The steam ejection from the valve produces the two undesirable effects previously described, that is, the recoil effect and the bubble effect.

By surrounding the steam valve 73 with a deflector-and-jet splitter 15, the ejected steam bubble will be in a plane normal to its regular discharge path thereby eliminating the upward reaction force, whereas the splitting of each steam bubble into four steam bubbles produces a secondary cavity in the suction chamber 70 and four main cavities 74. Again, the implosion of the cavity within the suction chamber 70 takes place after the implosion of the main cavities 74, thereby allowing the cavity in the suction chamber to absorb the rebound effect from the implosions of the main cavities 74.

GENERAL CONSIDERATIONS AND ADVANTAGES

The essential requirements for the formation of a cavity depend on the conditions surrounding the deceleration or stoppage of piston 20. On the other hand, in order for a cavity to produce a useful pressure pulse PP, it is necessary that the velocity of the main water jet 22a (FIG. 8) prior to the stoppage of piston 20 be sufficiently great.

It is important to bear in mind the form and the nature of the frequencies of the general pressure signal produced by an implosive compressive. FIG. 16a shows the general pressure signal or pressure signature as a function of time, measured at a fixed distance from the center of implosion. The first portion 1 of this curve shows an increase in the ambient pressure Pha within the water corresponding to the propulsion of the jet 22a. This overpressure reaches a peak $\Delta Po$ and thereafter the pressure decreases. The portion 2 of this curve shows that when piston 20 is abruptly stopped, the pressure decreases until it becomes negative relative to the hydrostatic pressure. This negative pressure which corresponds to the formation of the cavity and its enlargement in volume, continues until the depression has reached its maximum value $-\Delta P$. When the volume of the cavity is at its maximum, its potential energy transforms into kinetic energy in the water layer surrounding the cavity. Portion 3 of this curve marks the implosion which produces a pressure reaching a high peak $\Delta P_1$, which is the maximum pressure in the ambient water at the point of measurement subsequent to the implosion of the cavity (FIG. 5). Portion 4 of this curve illustrates the rebound of the mass of the high-pressure water filling the cavity (FIG. 6). The rebound results in secondary cavitations followed by secondary implosions which can repeat themselves successively several times. These cavitations and implosions produce successive peaks $\Delta P_2$, $\Delta P_3$, etc., which decrease in amplitude and alternate with valleys corresponding to depressions.

On the scale of time, T designates the period of the signal measured from the start time to the end of the primary or first implosion. This period T depends on the potential energy of the cavity, and hence on the kinetic energy in the water jet 22a (FIG. 3) or on the thermodynamic energy of the vapor bubbles (FIG. 21), and also on the distance of the cavity from the water surface, that is on the hydrostatic pressure head above the cavity. The total duration of the pressure signature is T1 which determines the seismic resolution. The resolution is greater when T1 is smaller.

The basic curve shown in FIG. 16a is not the one normally used in geophysical exploration. The useful signal is that portion of this basic curve which is left after it is filtered at 8–62 Hz from the point of view of penetration, or after it is filtered at 0–248 Hz, from the point of view of resolution.

Figure 16B:
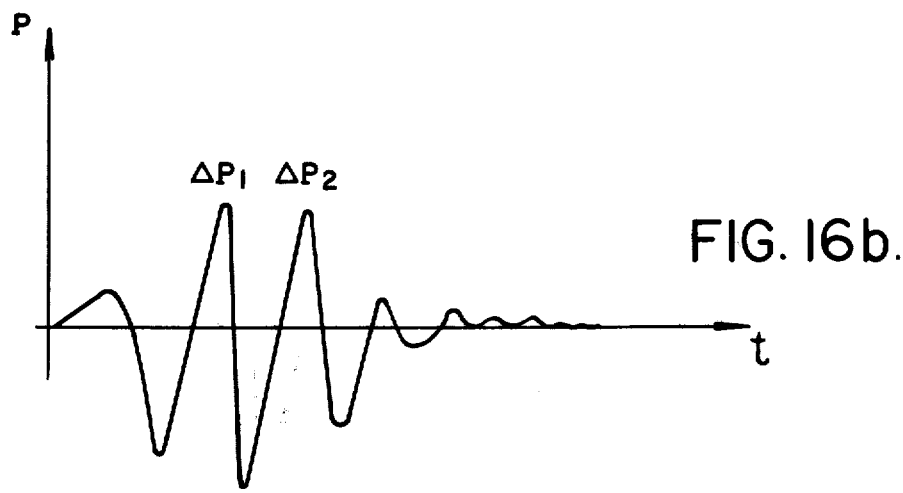
Figure 20:
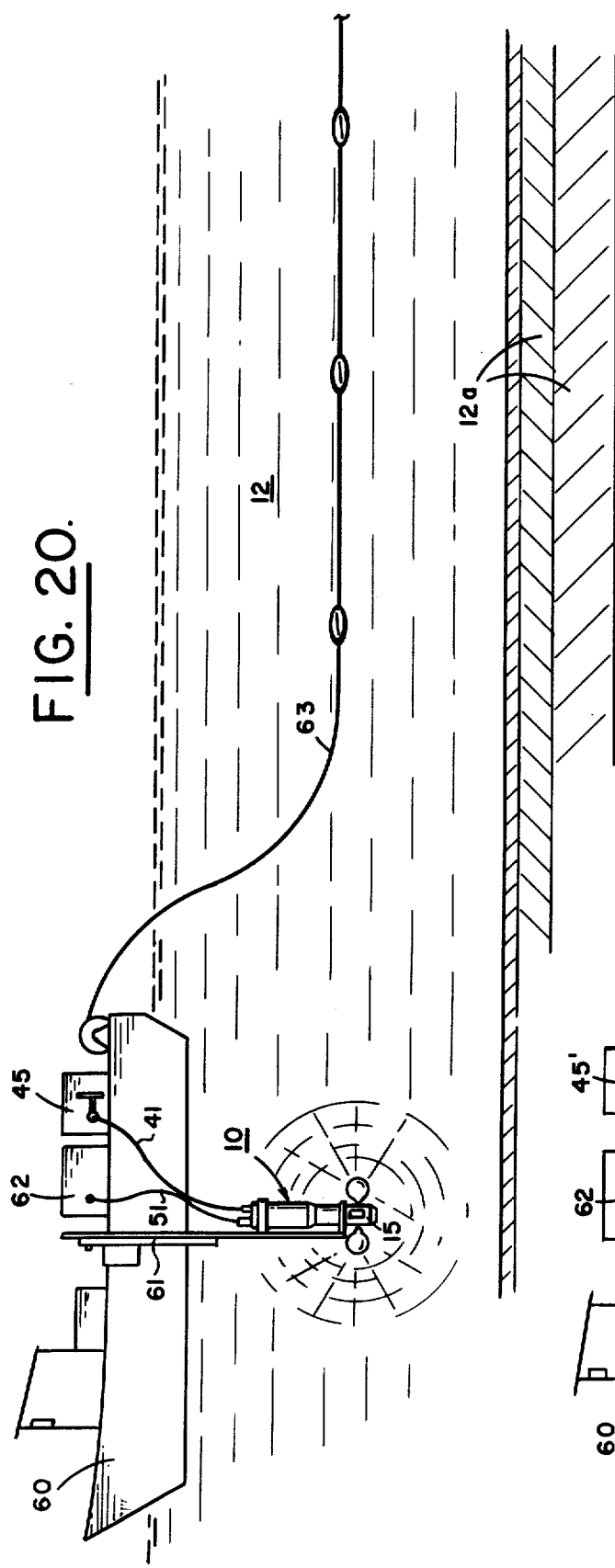
FIG. 20 illustrates the method of employing the implosive generator of the invention for conducting seismic exploration in a body of water.

FIG. 16b shows what is left of the pressure signature of FIG. 16a after being filtered at 8–62 Hz. One can see that the peak $\Delta P_1$ corresponding to the first implosion and containing high frequencies, does not appreciably look different from the peak $\Delta P_2$ corresponding to the implosion resulting from the first bubble pressure BP. The signal has therefore several peaks, which means that each earth layer 12a will produce many reflected signals that will be detected by the streamer cable 63 and recorded by unit 62 (FIG. 20).

The greatest portion of the utilizable energy is situated at the maximum of the implosion and is emitted in a relatively high-frequency band which is rapidly absorbed by the ground. The penetration of such a wave is relatively small.

Using suction chamber 70 it is possible to suppress the secondary peaks $\Delta P_2$, $\Delta P_3$ by suitably shaping the dimensions of the ports 15c (FIGS. 9, 10). It is possible in this manner to create different size cavities 70A–70D whose periods of implosion are also different, all of which allows to create at the time of the secondary peaks $\Delta P_2$, $P_3$ (FIG. 16a) opposite peaks of opposite phase which produce the desired pressure cancellations.

Such shaping of implosion cavities is of particular interest to relatively small-size implosion producing generators wherein the ports 15c have dimensions which do not allow the sufficient absorption of the high-pressure water in the internal suction chamber 70 (FIG. 14) during the rebound of the primary cavities 70A–70D subsequent to implosion.

Figure 18A:
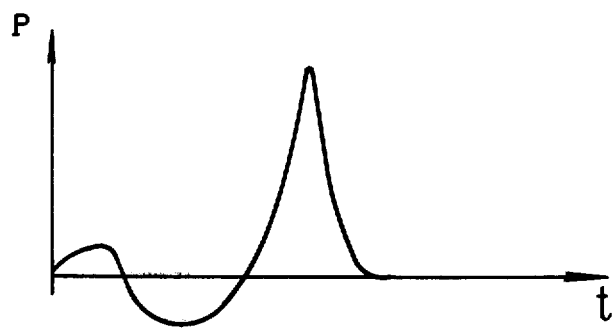
FIG. 18a is a representation of the direct waveform produced by the generator of FIG. 9.
Figure 18B:
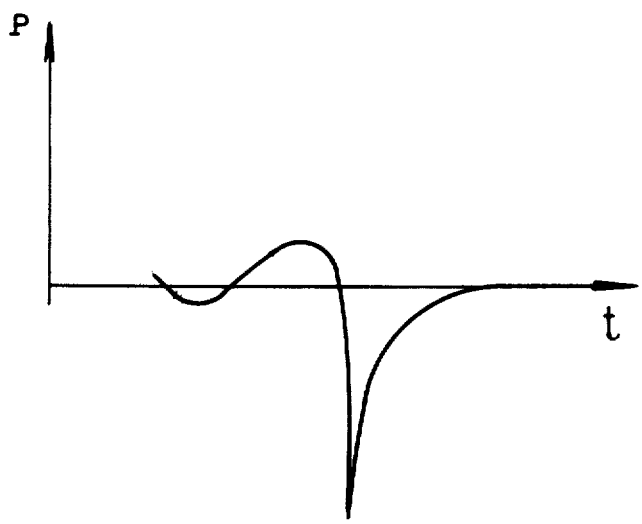
FIG. 18b is a representation of the direct waveform, after being reflected from the water surface.
Figure 18C:
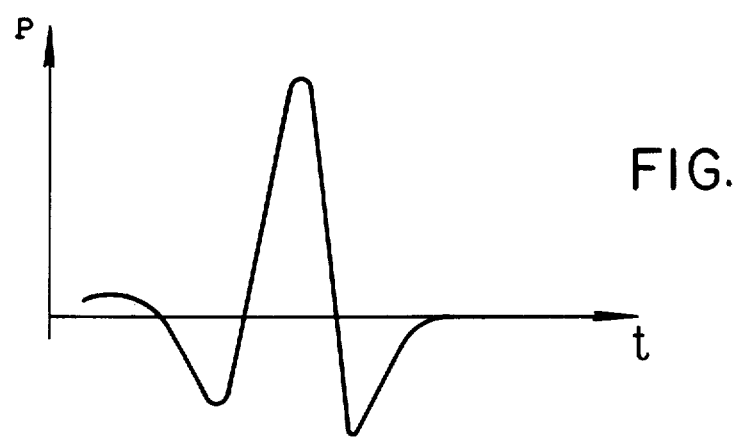
FIG. 18 c is a representation of the combined waveform.

In accordance with this invention, the shortening of the period T1 of the emitted signal is very advantageous: the reflected signal (FIG. 18b) from the water's surface becomes superimposed on the direct signal (FIG. 18a) to form a combined signal (FIG. 18c), but with a phase difference corresponding to the time it takes for the direct signal to complete the round trip from and to the site of implosion. That is, the improved generator of this invention (FIG. 9) allows to superimpose the positive portion of the direct signal (FIG. 18a) with the positive portion of the reflected signal (FIG. 18b), for relatively shallow implosions. Combining these signals (FIGS. 18a and 18b) produces a resultant signal (FIG. 18c) which is of particular interest since it contains relatively high energy in the low frequency band, especially because of the utilization of the low frequencies contained in the positive portion of the reflected signal (FIG. 18b). Accordingly, for the same amount of input energy to the generator, it is possible to considerably increase the penetration power of the combined signal (FIG. 18c).

Figures 17A, 17B:
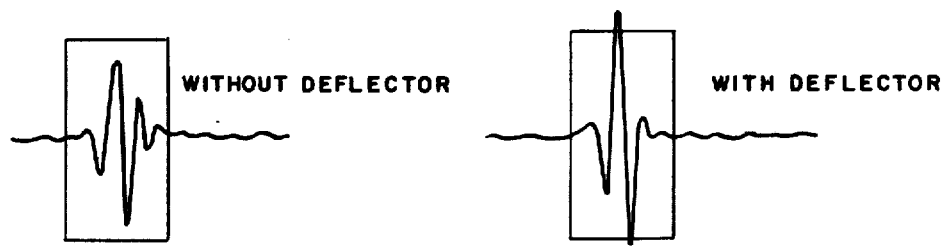
FIG. 17a is a waveform produced with the generator of FIG. 1.
FIG. 17b is a waveform produced with the improved generator of FIG. 9.

The actual waveform of the signals monitored with a hydrophone near the site of implosion with the generator of FIG. 1 is shown in FIG. 17a, and with the generator of FIG. 9 it is shown in FIG. 17b. The experimental results therefore confirm the theoretical waveforms.

Thus, the improved generator (FIG. 9) produces a waveform containing only a predominant single peak (FIG. 18c), which contains a large quantity of energy at relatively low frequencies and is of relatively short duration so that it is capable of having a large penetration into the earth formation as well as good resolution.

What is claimed is:

1. In an implosive generator adapted to become at least partly submerged in a body of liquid, said generator having a slug chamber provided with an outlet bore freely communicating with said liquid for abruptly expelling therethrough a liquid slug from said slug chamber into said liquid body, the improvement comprising:
a housing defining a suction chamber freely communicating with said bore, said suction chamber having at least one port, whereby, in use, the liquid slug is expelled from said bore into said suction chamber and exits through said port as a liquid jet, and said jet upon becoming expelled from said suction chamber forming a vacuum cavity in said suction chamber and a primary cavity in the liquid body surrounding the suction chamber, the liquid body rushing into the primary cavity whereby the liquid body becomes compressed and emits a desired primary acoustic signal; said compressed liquid expanding inside the vacuum cavity in said suction chamber which has a volume such that the expansion of the compressed liquid is not accompanied by a significant secondary acoustic signal.

2. The generator of claim 1 wherein the liquid slug is propelled along a main trajectory, said housing having at least two oppositely-positioned ports, and means in said housing for deflecting the liquid slug in a plane substantially normal to the main trajectory.

3. An implosive generator, comprising:
a main housing defining a slug chamber which, when the housing is submerged in the liquid, confines a liquid slug therein, the slug chamber having a main port communicating with the liquid body;
force-producing means for applying a force to the liquid slug, thereby propelling at a very-high velocity the liquid slug through the main port;
means to automatically remove in a relatively short time interval the force applied to the liquid slug thereby creating outside of the main housing a main cavity which is imploded by the liquid body, thereby producing an acoustic impulse in the liquid body;
a secondary housing defining a suction chamber having at least one port communicating with the liquid body, said suction chamber being in the vicinity of said main cavity; and
means producing a suction cavity in said suction chamber, said suction cavity imploding after the implosion of said main cavity.

4. The generator of claim 3, and deflector means exterior of and fixedly secured to said main housing to cancel the recoil on said main housing resulting from the propulsion of the slug, said deflector means deflecting the the trajectory of said propelled liquid slug.

5. The generator of claim 3, and said secondary housing means for splitting the propelled water slug into at least two branch jets, the kinetic energy of each jet being sufficient to create a main cavity which is imploded by the liquid body, and said suction cavity in said suction chamber suppressing the bubble effect produced by the implosions of said main cavities.

6. The generator of claim 5, and means for diverting each branch jet in a plane which is inclined relative to trajectory of said water slug.

7. A generator for producing acoustic impulses when submerged in a body of water, the generator including a main housing defining a first bore having a bottom stop wall defining a main port, and a top stop wall defining a top port; a shuttle having a main piston, a second piston, and a push rod coupling the pistons in spaced relation; the main piston being slidably mounted in the first bore, which defines a slug chamber having said main port, between the bottom stop wall and the main piston, and a vent chamber, between the main piston and the top stop wall; the slug chamber confining a slug of water therein; said housing further defining a second bore in which the second piston is slidably mounted; the second bore defining a return chamber, between the second piston and a fixed seal ring, which slidably receives the push rod, and a trigger chamber between the second piston and the housing; a reservoir chamber in said housing; the return chamber having a pressure inlet, the trigger chamber having a vent hole and a pressure inlet, the reservoir chamber having a pressure inlet and a pressure outlet; and the vent chamber having a vent hole; a normally-closed, mechanically-operated valve coupling an air pressure source to the inlet of the reservoir chamber; the return chamber being directly coupled to the pressure source; a normally-closed, electrically-operated valve coupling the outlet from the reservoir chamber to the inlet of the trigger chamber; a plunger movably mounted in the wall of the housing above the trigger chamber, the plunger being displaced by the second piston, when the second piston reaches its uppermost position in the second bore, thereby opening the mechanically-operated valve, which admits air pressure to the reservoir chamber; the electrically-operated valve, when energized by an electric signal, admitting air pressure from the reservoir chamber to the trigger chamber, thereby causing the shuttle to execute a forward stroke that propels the water slug which forms a water jet that exits through said main port into the body of water; and said shuttle automatically executing a return stroke in response to the air pressure confined in the return chamber.

8. The generator according to claim 7, wherein said main port has a beveled surface tapering inwardly which forms a seat that matches the beveled surface of a portion of the main piston.

9. The generator according to claim 8 and further including a suction chamber having a bottom wall for deflecting said water slug in a plane which is inclined relative to the trajectory of said water slug, and at least two ports for splitting the deflected water slug into at least two water jets, separated from each other by a sufficient angular distance to remove the recoil on the generator.

10. The generator according to claim 7 and further including an expansion chamber having a vent hole for venting into the water body, and the expansion chamber fluidly communicating with the vent hole of the vent chamber.

* * * * *